Patented Oct. 14, 1947

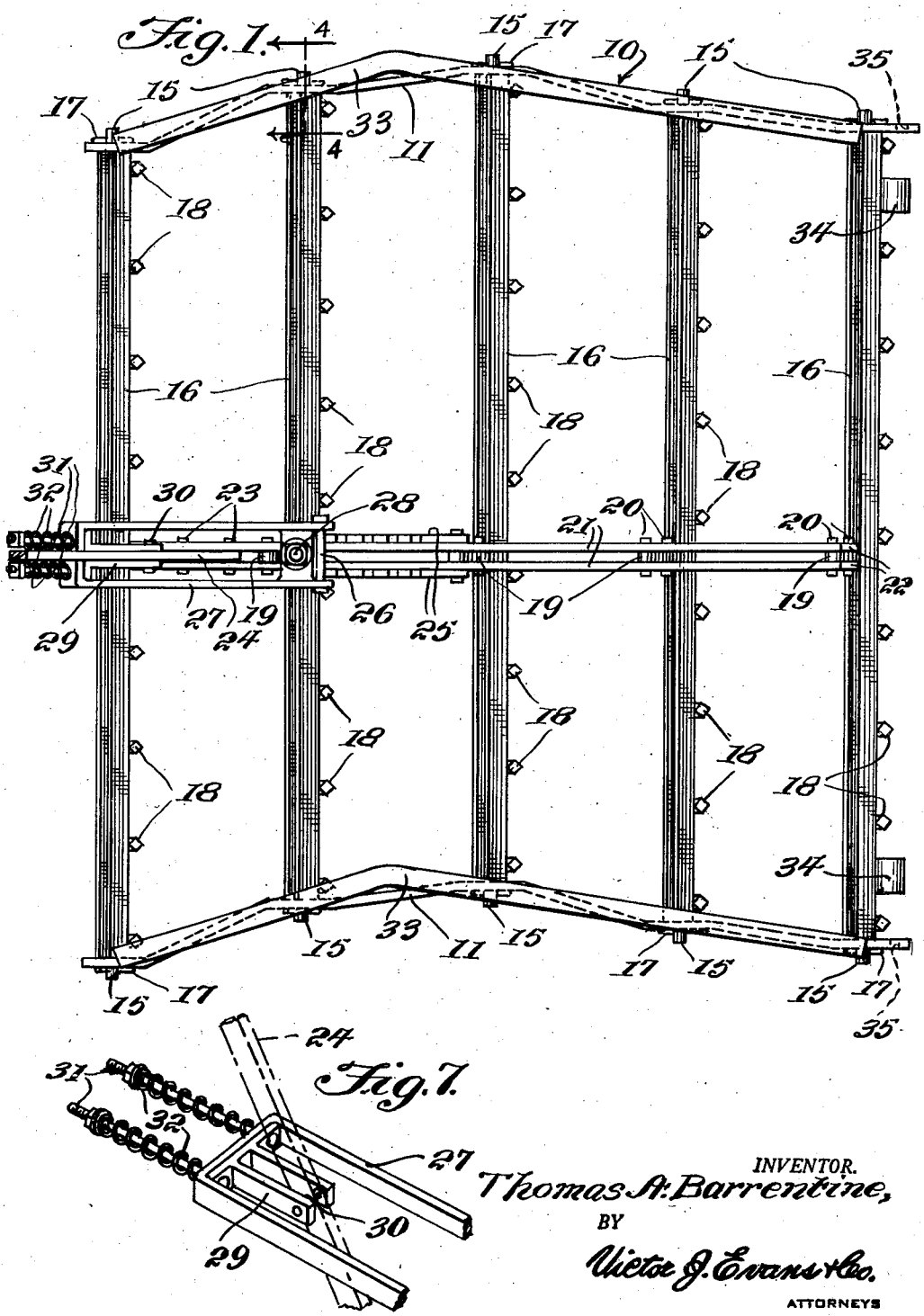

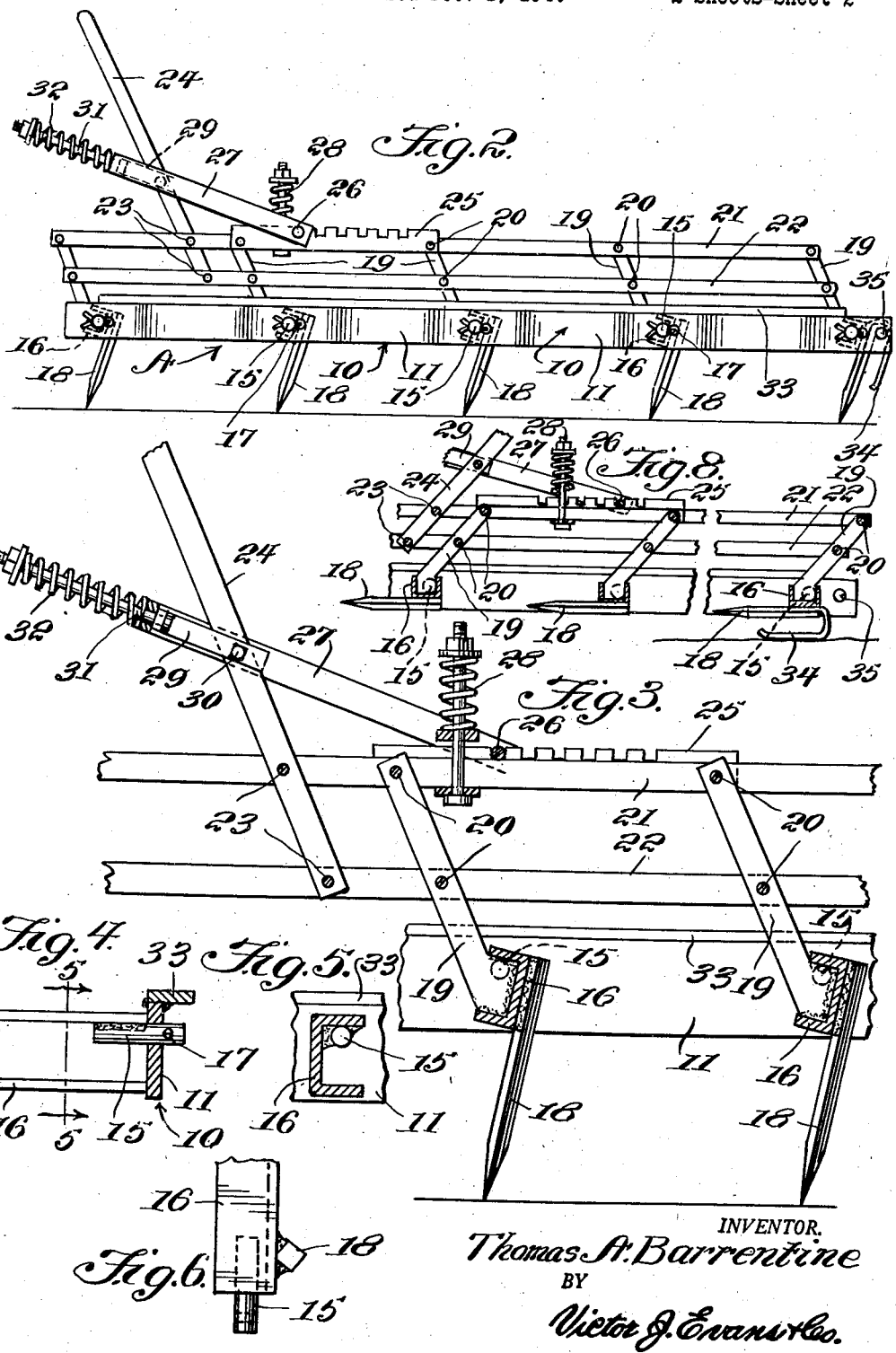

2,429,013

UNITED STATES PATENT OFFICE 2,429,013

HARROW WITH YIELDING BARS

Thomas A. Barrentine, Greenwood, Miss.

Application December 1, 1944, Serial No. 566,073

3 Claims. (Cl. 55—129)

The invention relates to a drag harrow, and more essentially to a tractor section harrow.

The primary object of the invention is the provision of a harrow of this character, wherein the teeth thereof are balanced against spring-type shock absorbers, these absorbing all shocks and jars in rough and stumpy soil, and such teeth can be adjusted to any position desired, the harrow being especially adapted for use with a tractor.

Another object of the invention is the provision of a harrow of this character, wherein it is of a sectional set-up, and these sections are flexibly linked to one another, thereby giving selected rise and fall thereto, when the harrow is being pulled, to maintain perfect harrowing operation in its use.

Still another object is to provide means for sliding the harrow over the ground for transporting the same, and in addition means are provided for reinforcing the frame side members.

A further object of the invention is the provision of a harrow of this character, wherein the shock absorbing action thereof is unique and novel, the harrow being susceptible of ready and easy adjustment by hand, and is relieved from tooth breakage.

A still further object of the invention is the provision of a harrow of this character, which is simple in construction, thoroughly reliable and efficient in operation, strong, durable, susceptible of heavy duty, conveniently adjusted, capable of wide and narrow range harrowing action, and inexpensive to manufacture.

With these and other objects in view, the invention consists in the features of construction, combination and arrangement of parts as will be hereinafter more fully described, illustrated in the accompanying drawings, which show the preferred embodiment of the invention, and pointed out in the claims hereunto appended.

In the accompanying drawings—

Figure 1 is a top plan view of a harrow constructed in accordance with the invention.

Figure 2 is a side elevation thereof.

Figure 3 is a fragmentary enlarged vertical sectional view through the harrow.

Figure 4 is a fragmentary sectional view taken on the line 4—4 of Figure 1 looking in the direction of the arrows.

Figure 5 is a sectional view on the line 5—5 of Figure 4 looking in the direction of the arrows.

Figure 6 is a fragmentary top plan view of the structure shown in Figures 4 and 5.

Figure 7 is a fragmentary perspective view of the shock absorbing arrangement of the harrow.

Figure 8 is a detailed section showing the teeth moved to a position flat against the ground and with the slide in position to contact the ground for transportation.

Similar reference characters indicate corresponding parts throughout the several views in the drawing.

Referring to the drawings in detail, A designates generally one section of a harrow constructed in accordance with the invention, and a description of this section will suffice for that of other sections, which are in their set-up.

The section A comprises a frame 10 having opposed irregularly angled side bars 11 through which extend the pins or stub shafts 15 secured to and carrying channel shaped bars 16 on which the harrow teeth are mounted as shown in Figures 3, 4, 5 and 6. The trunnion ends of members 15 extend through openings in side bars 11 and are cotter-pinned as at 17 to be rotatably held in place. It will thus be seen that the frame side bars are sturdy and adequately reinforced; that the teeth are properly carried on channel bars 16 which are of strong construction, and that such bars are rotatably mounted by trunnions 15.

On the channel members 16 are the harrow teeth 18, which are welded or otherwise secured thereto in upright spaced relation to one another. Each bar 16 has fixed thereto an upwardly directed turning arm 19, having pivoted at 20 thereto upper and lower toggle linkage 21 and 22, respectively, which aft of the frame have pivotal connection at 23 with a throw lever 24, the latter being intermediate with relation to a pair of the arms 19. The upper linkage 21 has fitted thereto a toothed keeper rack 25, in which is selectively engaged the latching cross key or pin 26 of a latching yoke 27, the latter being provided with a spring tensioned retentioning device 28 for holding the key or pin 26 in its engaged position in the rack 25, as best seen in Figure 3 of the drawings.

Spring floated in the yoke 27 at its outer closed end is a coupling saddle 29, which is pivoted at 30 to the throw lever 24 at an elevated point thereof, so that the yoke slopes in the direction of the rack 25 in a forward manner. The saddle 29 through the shanks or stems 31 thereon is slidably fitted to the closed end of the yoke, and these shanks or stems carry tensioning springs 32, which function as shock absorbers, to relieve shocks and jars to the harrow teeth 18 when working in rough and stumpy soil.

When two or more of the frames are used for harrowing, the said frames are flexibly linked together through openings 35 in the front ends of bars 11 so that they are connected for selective rise and fall individually thereto.

Attached by welding or the like to the side sills 11 are reinforcing bars 33 which have been found desirable to hold sills 11 in shape after they have been formed.

In transporting the harrow, the throw lever 24 is moved forward to its farthest point which moves the channel member 16 to position the teeth 18 horizontally and parallel with the ground in which position the U-shaped slide 34 is moved to the position shown in Figure 3 engaging the ground to slide the harrow thereover. It is not necessary to turn the harrow over for transportation from one place to another.

What is claimed is:

1. A harrow of the kind described comprising a frame having irregularly angled side bars formed with top reinforcing members, a plurality of channeled rocking bars having trunnions thereon inset in said frame, turning arms carried by the bars, harrow teeth on the bars, upper and lower toggle linkage pivotally connecting the arms, a throw lever for actuating the linkage, a latching yoke, a coupling saddle positioned in the closed end of said yoke, said saddle being pivoted to said lever, stems on said saddle for slidably connecting said yoke to said saddle, a toothed keeper on said upper toggle link, coacting with said yoke, and tensioning springs on said saddle adapted to absorb shocks received by said harrow teeth.

2. The invention as in claim 1, wherein said yoke is provided with a latching cross pin and means for retaining said pin in said keeper is secured to said upper toggle link adjacent one end of said keeper.

3. The invention as in claim 1 wherein slide members are formed on the forward harrow teeth which when moved to a horizontal position permits transportation of said harrow over the ground.

T. A. BARRENTINE.

REFERENCES CITED

The following references are of record in the file of this patent:

UNITED STATES PATENTS

| Number | Name | Date |
|---|---|---|
| 518,912 | Brown | Apr. 24, 1894 |
| 675,428 | Voorhees | June 4, 1901 |
| 2,236,780 | Oerman | Apr. 1, 1941 |
| 508,784 | Todd | Nov. 14, 1893 |
| 1,176,334 | Bergman | Mar. 21, 1916 |
| 2,321,663 | Donovan | June 15, 1943 |